(12) United States Patent
Lai

(10) Patent No.: US 6,407,356 B1
(45) Date of Patent: Jun. 18, 2002

(54) ELECTRICAL DISCHARGE MACHINING DEVICE

(76) Inventor: Ton-Shih Lai, No. 52-26, Kuang Min Road, Hsi Tun Area, Taichung (TW)

( * ) Notice: Subject to any disclaimer, the term of this patent is extended or adjusted under 35 U.S.C. 154(b) by 21 days.

(21) Appl. No.: 09/716,267

(22) Filed: Nov. 21, 2000

(30) Foreign Application Priority Data

Sep. 8, 2000 (TW) ........................................ 89215766 U

(51) Int. Cl.⁷ .................................................. B24H 1/00
(52) U.S. Cl. .................................. 219/69.11; 219/69.14
(58) Field of Search ........................... 219/69.11, 69.14; 184/106

(56) References Cited

U.S. PATENT DOCUMENTS

| | | | | |
|---|---|---|---|---|
| 4,622,449 A | * | 11/1986 | Inoue | 219/69 R |
| 4,628,170 A | * | 12/1986 | Furukawa | 219/69 D |
| 5,078,234 A | * | 1/1992 | Lin | 184/106 |
| 5,336,863 A | * | 8/1994 | Terui | 219/69.14 |

FOREIGN PATENT DOCUMENTS

JP 6-126541 * 5/1994 ............ B23H/7/26

* cited by examiner

*Primary Examiner*—M. Alexander Elve
(74) *Attorney, Agent, or Firm*—Browdy and Neimark, P.L.L.C.

(57) ABSTRACT

An electric discharge machining device comprises a base, a support column, an oil bath, a work platform, a draining pipe, and a linear actuator. The base has an oil storage compartment. The oil bath has a receiving space and a drainage hole through which the support column is put. The draining pipe is fitted over the support column such that one end of the draining pipe is connected with the drainage hole and that other end of the draining pipe is in communication with the oil storage compartment. The oil bath is actuated to slide up and down between an upper position and a lower position. When the oil bath is located at the upper position, the bath is filled with the process oil. When the oil bath is located at the lower position, the process oil is drained out of the oil bath into the oil storage compartment of the base.

8 Claims, 4 Drawing Sheets

ELECTRICAL DISCHARGE MACHINING DEVICE

FIELD OF THE INVENTION

The present invention relates generally to an electrical discharge machining device, and more particularly to an oil bath of the electrical discharge machining device.

BACKGROUND OF THE INVENTION

The work platform of the conventional electrical discharge machining device is located in the receiving compartment of an oil tank of the machining device. In operation, a workpiece is placed in the receiving compartment such that the workpiece and the process electrode are fully immersed in the process oil. Upon completion of the process, the process oil is drained to facilitate the removal of the workpiece from the oil tank. The oil tank is generally provided with an elevating mechanism comprising a plurality of hydraulic cylinders and pneumatic cylinders, which are located between the bottom of the oil tank and the base of the machining device. The bottom of the oil tank is provided with an axial hole for receiving a support shaft which is connected with the work platform. The oil tank is actuated by the cylinders to move up and down in relation to the work platform, so as to enable the work platform to emerge from the top of the oil tank to facilitate the disposing or the removing of the workpiece. The conventional oil tank elevating mechanism is defective in design in that the leak of the process oil is apt to take place unless the axial hole and the support shaft are airtightly sealed off with precision. In addition, the base of the conventional machining device is provided with additional facilities, such as the process oil storage tank, the process oil feeding pipe, and the process oil draining pipe, which take up additional space of the machine base and hinder the activity of a machine operator. In light of the-pipes being exposed, only the small pipes are suitable for use in feeding or draining the process oil at the expense of the feeding and the draining efficiencies.

SUMMARY OF THE INVENTION

It is the primary objective of the present invention to provide an electrical discharge machining device with a process oil tank elevating structure which is relatively simple in technique as compared with the prior art structure.

It is another objective of the present invention to provide an electrical discharge machining device with a, process oil tank elevating structure which is efficient in feeding and draining the process oil.

It is still another objective of the present invention to provide an electrical discharge machining device with a process oil tank elevating structure comprising the process oil storage tank, the process oil feeding pipe, and the process oil draining pipe, which are all concealed to minimize the overall volume of the machining device and to prevent them from impeding the activity of a machine operator.

The electrical discharge machining device of the present invention comprises a base, a support column, a process oil tank, a work platform, an oil feeding device, an oil drainage device, and a linear actuation device. The base has an oil storage compartment and an upright column. The support column is fastened at one end with the base and is located in the oil storage compartment. The oil tank has an open top and a drainage hole located at the bottom of the tank and dimensioned to dispose the support column therethrough. The work platform is fastened with other end of the support column and is located in the oil tank. The work platform is greater in area than the drainage hole. The drainage hole is connected with one end of a draining pipe which is connected at other end thereof with the oil storage compartment. The actuation device is mounted on the upright column and is connected with one side of the oil tank for actuating the oil tank to slide back and forth between an upper position and a lower position along the support column. As the oil tank is located at the upper position, the drainage hole is sealed off by the work platform, thereby allowing the oil tank to be filled with the process oil. When the oil tank is located at the lower position, the process oil is drained from the oil tank to the oil storage compartment via the draining pipe.

The machining device of the present invention is provided with a process oil feeding pipe which is put through the interior of the support column to be in communication with the oil storage compartment. The feeding pipe has an outlet end which is; located at the junction of the support column and the work platform such that the outlet end is in communication with the oil tank.

DETAILED DESCRIPTION OF THE INVENTION

Figure 1:
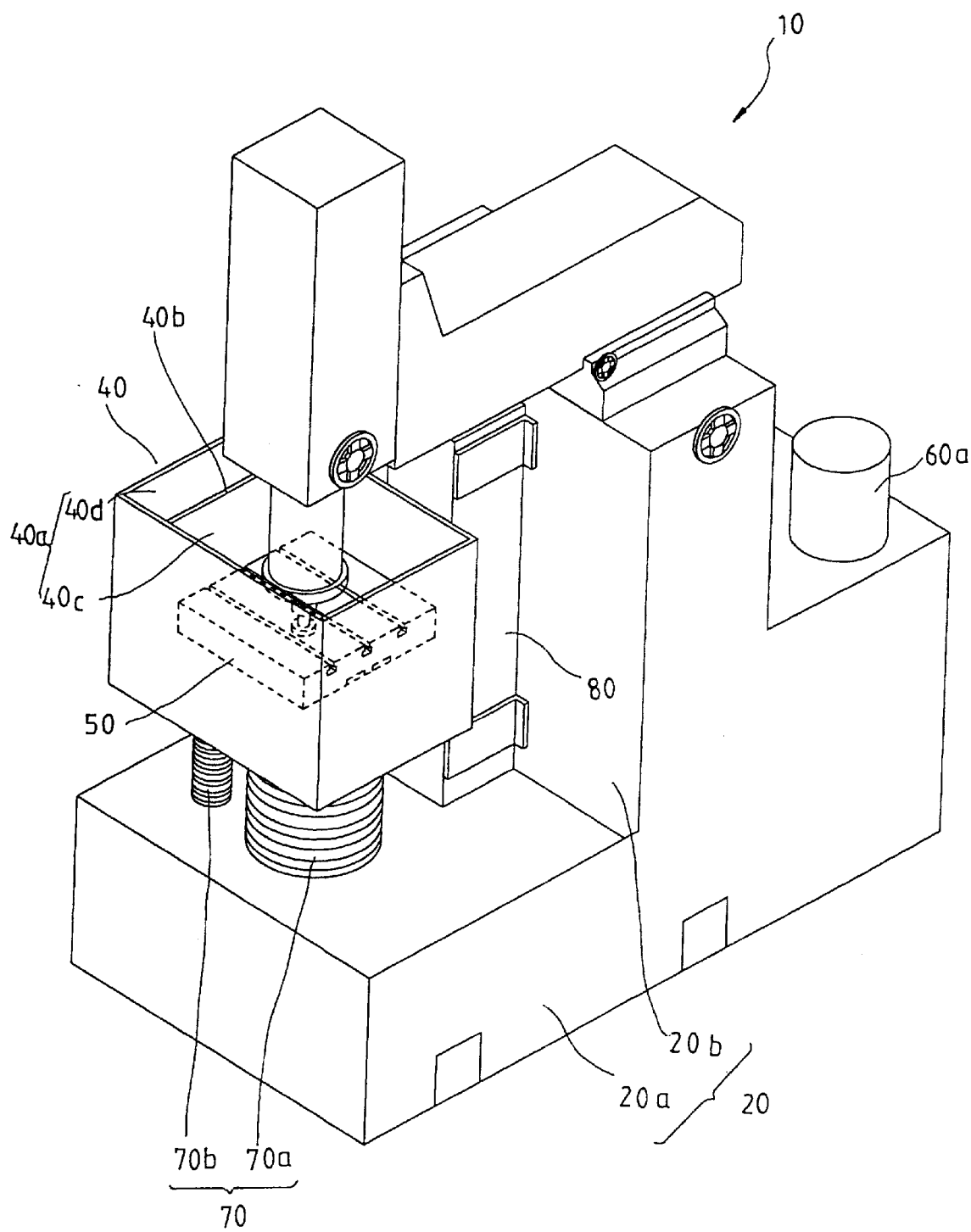
FIG. 1 shows a perspective view of a preferred embodiment of the present invention.
Figure 2:
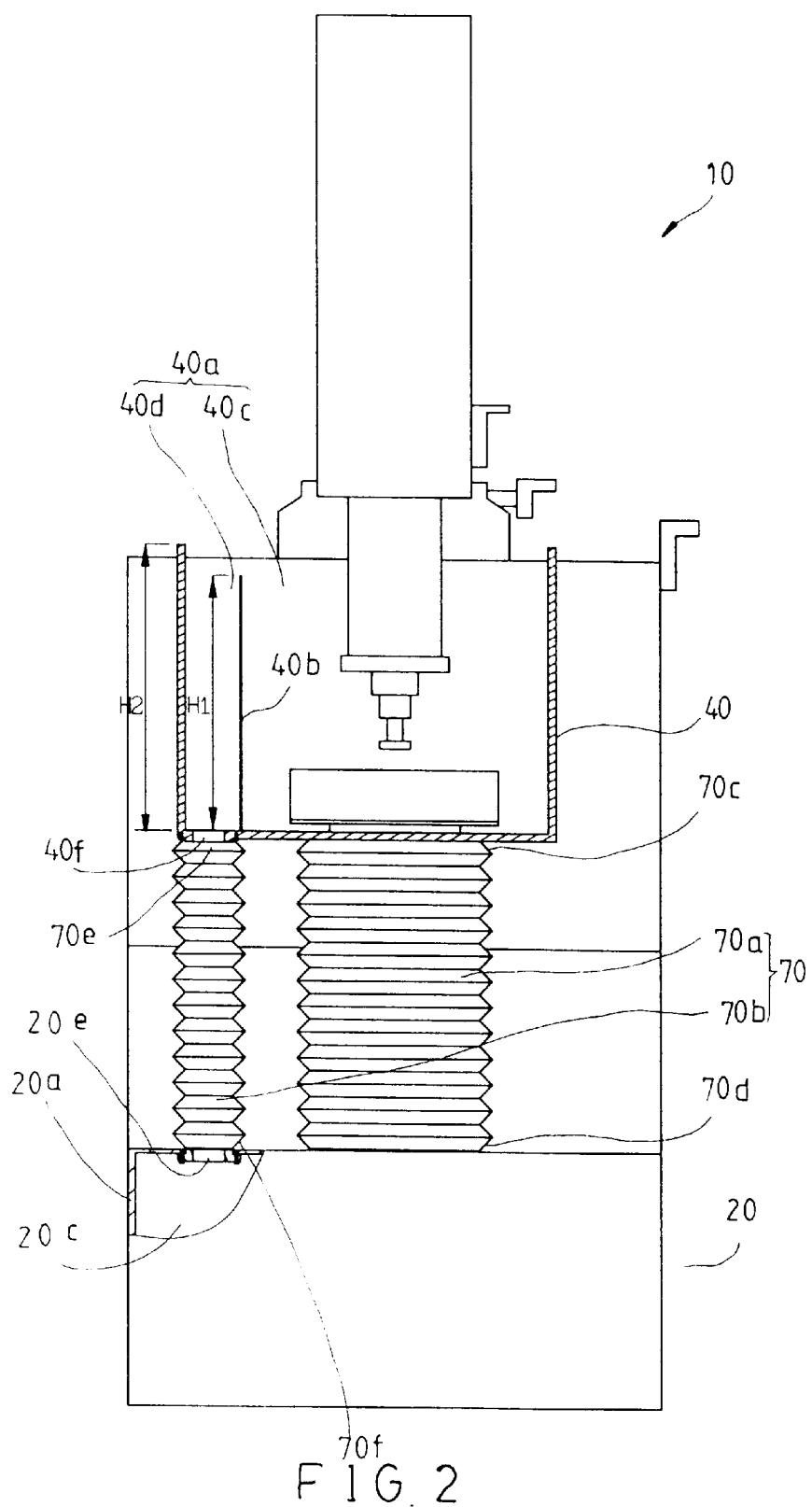
FIG. 2 shows a partial front sectional view of the preferred embodiment of the present invention.
Figure 3:
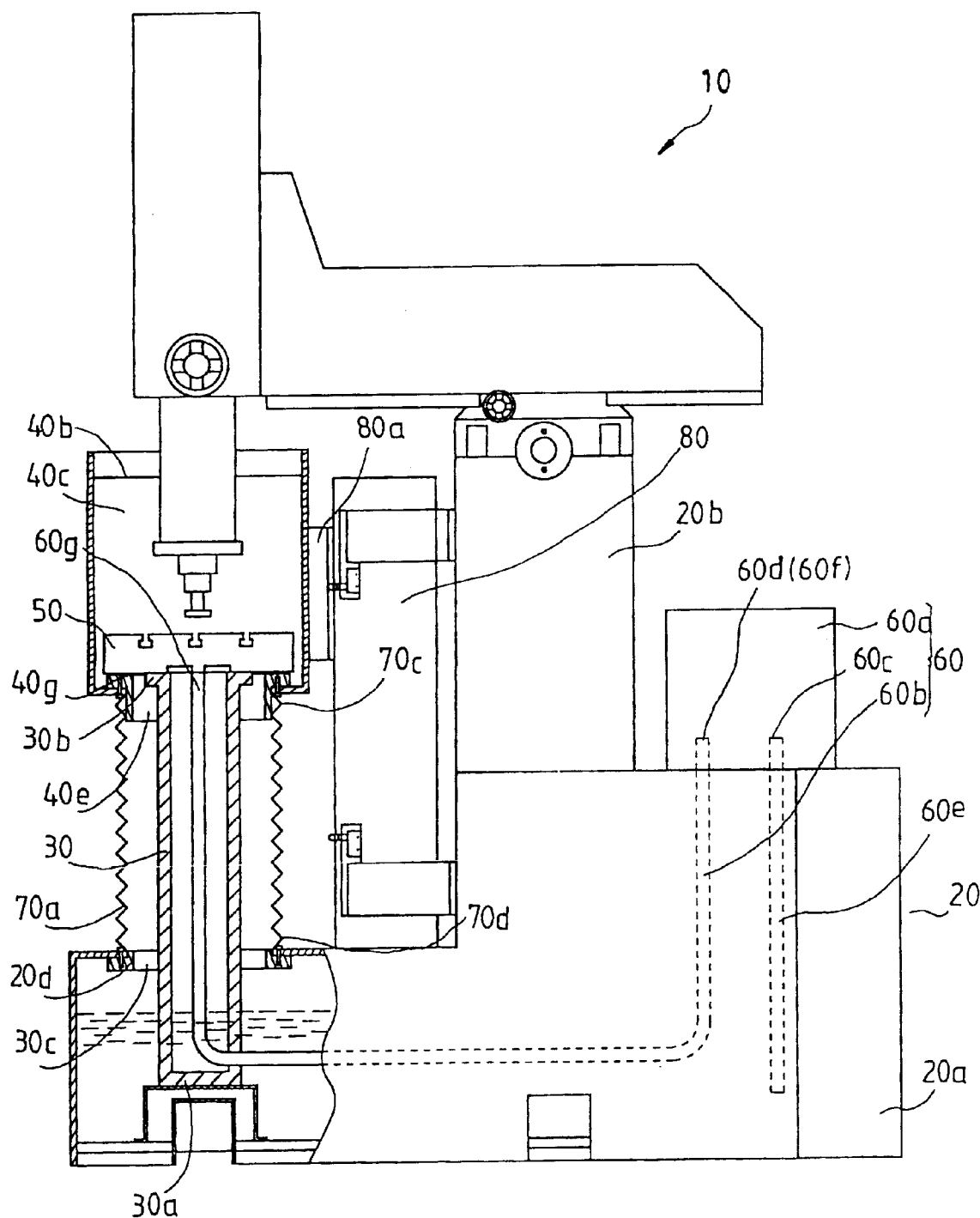
FIG. 3 is a partial side sectional view of the preferred embodiment of the present invention to show that the oil tank is located at the upper position.

As shown in FIGS. 1–3, an electrical discharge machining device 10 of the preferred embodiment of the present invention comprises a base 20, a support column 30, an oil tank 40, a work platform 50, an oil feeding device 60, an oil draining device 70, and a linear actuator 80.

The base 20 has a bottom seat 20a and an upright column 20b. The bottom seat 20a is provided in the interior with an oil storage compartment 20c for storing the process oil. The oil storage compartment 20c has a first drainage hole 20d and a second drainage hole 20e. The first drainage hole 20d is in communication with atmospheric air.

The support column 30 is of a hollow construction and is fastened at one end 30a with the bottom of the oil storage compartment 20c of the base 20 such that other end 30b of the support column 30 extends uprightly via the first drainage hole 20d. The support column 30 is much smaller in diameter than the first drainage hole 20d, thereby resulting in formation of an annular drainage interstice 30c between the hole wall of the first drainage hole 20d and the outer surface of the support column 30.

The oil tank 40 is provided therein with a receiving space 40a having an open top and a partition 40b which divides the receiving space 40a into a primary receiving space 40c and a secondary receiving space 40d. The partition 40b has a height H1 which is shorter than the height H2 of the side wall of the oil tank 40. The oil tank 40 is provided in the bottom with a drainage hole 40e and an overflow hole 40f, which are respectively corresponding in location to the primary receiving space 40c and the secondary receiving space 40d. The drainage hole 40e is provided with an airtight ring 40g and is much greater in diameter than the support column 30 to enable the support column 30 to be put therethrough.

The work platform 50 is fastened with one end 30b of the support column 30 and is located in the primary receiving space 40c of the oil tank 40. The work platform 50 is greater; in area than the drainage hole 40e of the oil tank 40.

The oil feeding device 60 comprises a pressure pump 60a and an oil feeding pipe 60b. The pressure pump 60a is mounted on the base 20 and is provided with an input end 60c and an output end 60d. The input end 60c is connected with the oil storage compartment 20c by a connection pipe 60e. The oil feeding pipe 60b has an input end 60f and an output end 60g. The input end 60f of the oil feeding pipe 60b is connected with the output end 60d of the pressure pump 60a. The oil feeding pipe 60b is partially disposed in the interior of the hollow support column 30 such that the output end 60g of the oil feeding pipe 60b is located at the junction of the support column 30 and the work platform 50, and that the output end 60g is in communication with the primary receiving space 40c of the oil tank 40. The process oil kept in the oil storage compartment 20c is pumped into the receiving space 40a of the oil tank 40 by the pressure pump 60a.

The oil draining device 70 comprises a draining pipe 70a and an overflow pipe 70b. The draining pipe 70a is fitted over the support column 30 such that one end 70c of the draining pipe 70a is connected to the drainage hole 40e, and that other end 70d of the draining pipe 70a is connected to the first drainage hole 20d of the oil storage compartment 20c. The overflow pipe 70b is connected at one end 70e with the overflow hole 40f, and at other end 70f with the second drainage hole 20e of the oil storage compartment 20c.

The linear actuator 80 is a hydraulic cylinder, a pneumatic cylinder, or an electric linear actuator, which is mounted on the upright column 20b and is provided with a connection member 80a connecting with one side of the oil tank 40. The oil tank 40 is actuated by the linear actuator 80 to slide up and down along the longitudinal direction of the support column 30 such that the oil tank is located fixedly at an upper position, as shown in FIG. 3, or at a lower position, as shown in FIG. 4.

As shown in FIG. 3, the oil tank 40 is located at the upper position, whereas the work platform 50 is located in the primary receiving space 40c such that the underside of the work platform 50 comes in contact with the airtight ring 40g, and that the work platform 50 seals off the drainage hole 40e. In the meantime, the process oil kept in the oil storage compartment 20a is pumped by the pressure pump 60a into the primary receiving space 40c of the oil tank 40 via the oil feeding pipe 60b until such time when the work platform 50 and the process electrode are fully immersed in the process oil. In the event that the surface of the process oil exceeds the top of the partition 40b, the excess of the process oil is accommodated in the secondary receiving space 40d, or the oil storage compartment 20a via the overflow pipe 70b.

Figure 4:
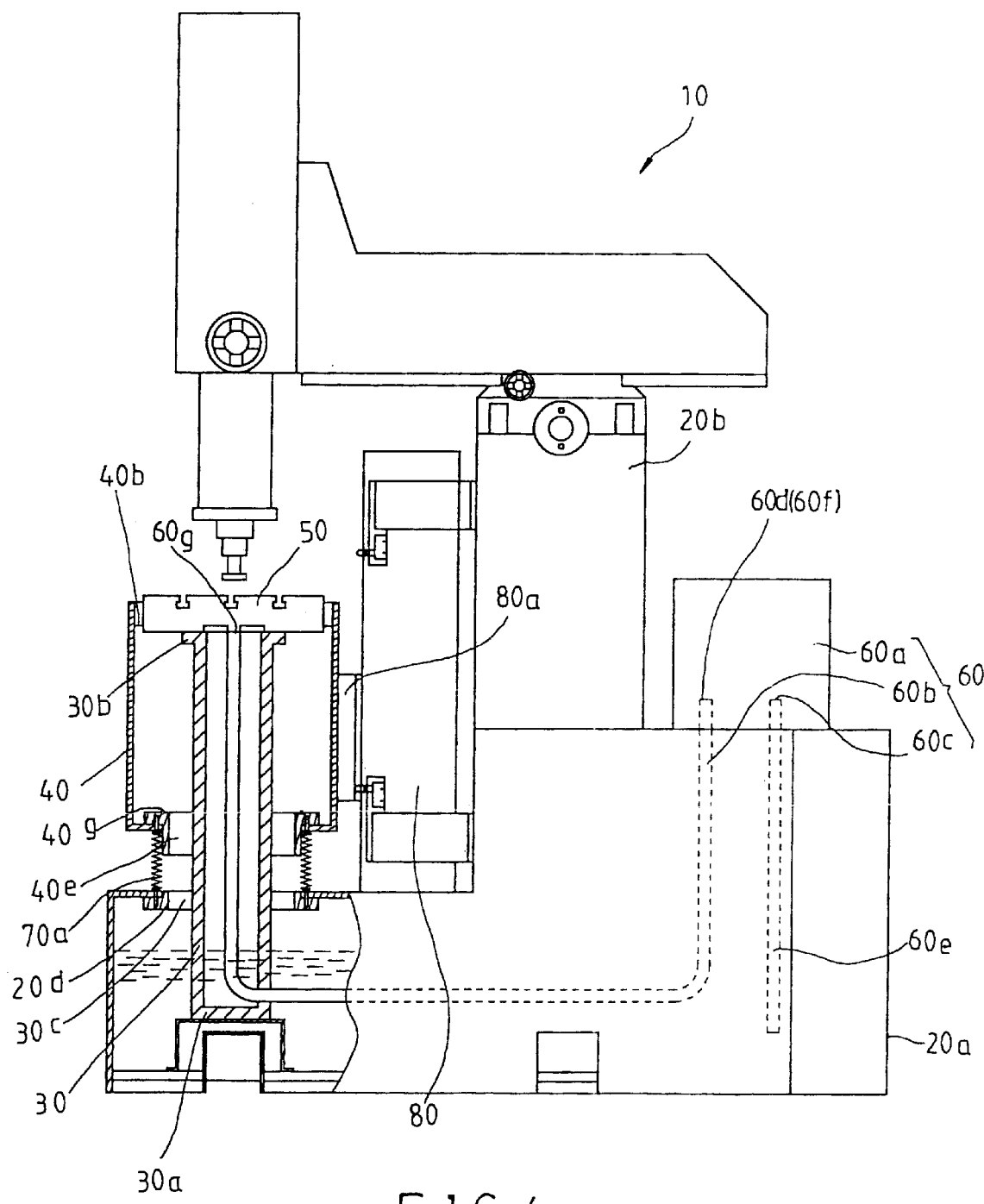
FIG. 4 is a partial side sectional view of the preferred embodiment of the present invention to show that the oil tank is located at the lower position.

As shown in FIG. 4, as soon as the oil tank 40 is actuated to slide from the upper position to locate fixedly at the lower position, the process oil is drained immediately from the primary receiving space 40c to the oil storage compartment 20a via the drainage hole 40e and the draining pipe 70a.

What is claimed is:

1. An electric discharge machining device comprising:
   a base having an oil storage compartment and an upright column;
   a support column fastened at one end with said base and located in said oil storage compartment;
   an oil tank provided with a receiving space having an open top, said oil tank provided in the bottom with a drainage hole whereby said support column is put through said drainage hole;
   a work platform fastened with other end of said support column and located in said receiving space of said oil tank, said work platform being greater in area than said drainage hole of said oil tank;
   a draining pipe fitted over said support column such that one end of said draining pipe is connected with said drainage hole, and that other end of said draining pipe is in communication with said oil storage compartment;
   a linear actuator fastened with said upright column and connected with one side of said oil tank for actuating said oil tank to slide along the longitudinal direction of said support column between an upper position and a lower position, said drainage hole being sealed off by said work platform at such time when said oil tank is located at said upper position, thereby enabling said receiving space of said oil tank to be filled with process oil which is kept in said oil storage compartment of said base, whereby the process oil in said receiving space of said oil tank is drained out to said oil storage compartment via said drainage hole and said draining pipe at such time when said oil tank is actuated by said linear actuator to slide from said upper position to locate at said lower position.

2. The electrical discharge machining device as defined in claim 1 further comprising:
   a pressure pump having an output end, and an input end in communication with said oil storage compartment; and
   an oil feeding pipe having an output end, and an input end in communication with said output end of said pressure pump, said output end of said oil feeding pipe being in communication with said receiving space of said oil tank.

3. The machining device as defined in claim 2, wherein said oil feeding pipe is disposed in said support column such that said output end of said oil feeding pipe is located at the junction of said support column and said work platform and is connected with said receiving space of said oil tank.

4. The electrical discharge machining device as defined in claim 1 further comprising an airtight ring fastened to the bottom of said oil tank and located at said drainage hole of said oil tank whereby said airtight ring comes in contact with said work platform at such time when said oil tank is located at said upper position.

5. The electrical discharge machining device as defined in claim 1 further comprising:
   a partition located in said receiving space of said oil tank such that said partition divides said receiving space: into a primary receiving space and a secondary receiving space, said partition being smaller in height than side wall of said oil tank;
   an overflow hole located at the bottom of said oil tank and connected with said secondary receiving space;
   an overflow pipe connected at one end with said overflow hole, and at other end with said oil storage compartment of said base.

6. The machining device as defined in claim 1, wherein said linear actuator is a hydraulic cylinder.

7. The machining device as defined in claim 1, wherein said linear actuator is a pneumatic cylinder.

8. The machining device as defined in claim 1, wherein said linear actuator is an electric actuator.

* * * * *